June 21, 1960      L. SUPOWITZ      2,941,504
CANINE TRAINING APPARATUS
Filed Dec. 16, 1957
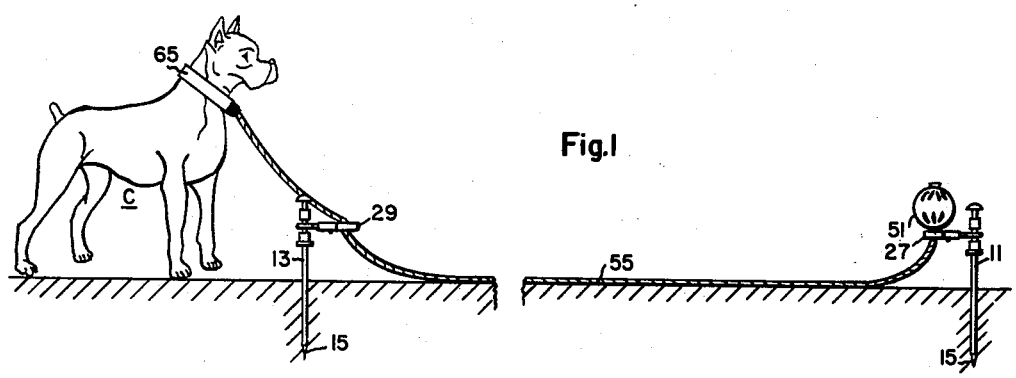
Fig.1
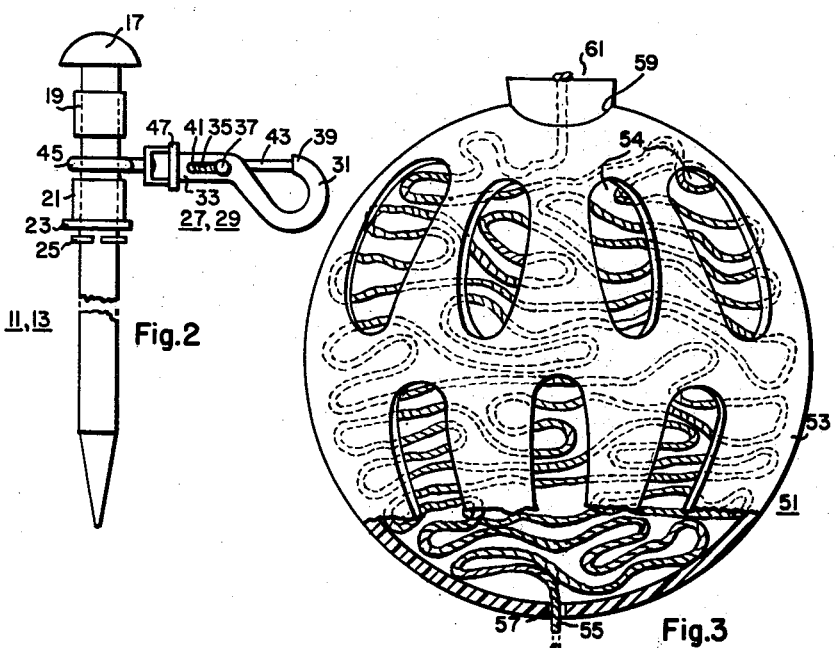
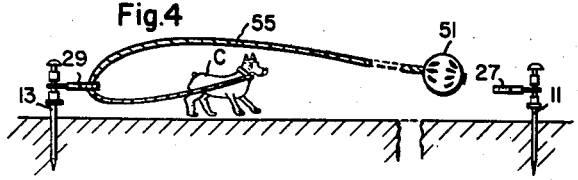
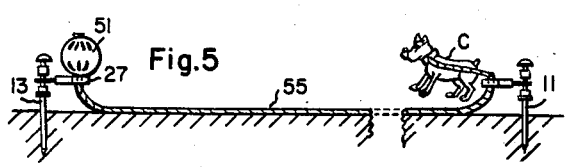
INVENTOR:
LEROY SUPOWITZ
BY: Albert C. Shapira
HIS ATTORNEY

United States Patent Office 2,941,504
Patented June 21, 1960

2,941,504

CANINE TRAINING APPARATUS

Leroy Supowitz, 2855 Fernwald Road, Pittsburgh, Pa.

Filed Dec. 16, 1957, Ser. No. 703,048

3 Claims. (Cl. 119—29)

This invention relates to the art of training animals and has particular relationship to the art of training canine and the like.

This invention in its broadest aspects arises from the realization that a canine may be training by developing in the canine Pavlov conditioned reflexes which become operative for a selected word stimulus. It is an object of this invention to provide apparatus for developing Pavlov conditioned reflexes in a canine.

In developing a Pavlov conditioned reflex in a canine it is essential that in training the canine the relationship between the stimulus and the desired response be maintained as direct and as simple as practicable. The canine must be repeatedly caused to respond in just one way to the same word stimulus. Any action accompanying the words to produce the response would confuse the canine and preclude the development of the reflex.

It is then a specific object of this invention to provide apparatus for training a canine by automatically confining the response of the canine to a stimulus in the manner desired so that the relationship between the stimulus and the response is simple and direct.

An ancillary object of this invention is to provide a bobbin assembly particulrly suitable for the training of a canine.

While this invention in its broader aspects may serve to train a canine to respond to commands of other types, the invention is applied in its specific aspects to train a canine to respond appropriately to the commands "stay" and "come." The apparatus in accordance with this invention permits a trainer by unobtrusive action to develop in the canine the reflexes to rest when he says "stay" and to move towards the trainer when he says "come."

The apparatus in accordance with this invention includes a line for controlling the canine's movement. The line is attached at one end to the canine's collar and at the other end extends from a bobbin. The apparatus also includes stakes each including means for releasably engaging the line. When the line is engaged with the means it can only be pulled through the means until the means engages the bobbin. The stakes are secured in the ground a predetermined distance apart and the line is engaged with the releasable means successively at each of the stakes and disengaged from each so that as the bobbin is stopped or permitted to move, the canine is restricted to respond automatically in the manner desired to the commands "stay" and "come."

The novel features considered characteristic of this invention are described generally above. The invention itself both as to its organization and as to its method of operation together with additional objects and advantages thereof will be understood from the following description of a specific embodiment taken in connection with the accompanying drawing, in which:

Figure 1 is a view partly in side elevation and partly in perspective showing a preferred embodiment of this invention;

Fig. 2 is a view in side elevation of a stake assembly used in the practice of this invention;

Fig. 3 is a view partly in side elevation and partly in section of a bobbin assembly in accordance with this invention;

Fig. 4 is a view similar to Fig. 1 but showing the apparatus set so that canine responds to the command "come," and Fig. 5 is a view similar to Fig. 1 but showing the apparatus set so that the canine responds to the command "stay."

The apparatus shown in the drawing includes a pair of similar stakes 11 and 13. The stakes 11, 13 may be composed of metal, wood or plastic but in the interest of economy are usually composed of a strong plastic material. Each stake is tapered to a point at one end 15 and has a head 17 at the other. At the end near the head 17 of each stake there are a pair of sleeves 19 and 21. The lower sleeve 21 is held in position by a washer 23 which engages a retaining ring 25.

A swivel snap-eye 27 and 29 is mounted on each stake between the sleeves 19 and 21 so that its movement along the stake 11 or 13 is limited by the sleeves. Each snap-eye includes a hook 31, the stem 33 of which is hollow and has a longitudinal slot 35. A pin 37 is slidable in the slot 35 and is urged towards the tip 39 of the hook by a spring 41. The pin 37 carries a tongue 43 which is urged to close the opening in the hook by the spring 41 and may be retracted so the opening is open by moving the pin 37 towards the end of the stem 33.

A ring 45 extends from a disc 47 which closes the end of the stem 33. The ring encircles the stake 11 or 13 and is held between the sleeves 19 and 21.

The apparatus according to this invention also includes a bobbin assembly 51 (Fig. 3). This assembly includes a hollow body 53 which may be a hollow sphere or like body. The body 53 may be composed of a light plastic and may have holes 54 to reduce its weight. The assembly also includes a line 55. The body 53 has an opening 57 which snugly fits the line 55 but permits the line to pass through it into or out of the body. The body 53 also has a second opening 59 which advantageously is opposite diametrically to the opening 57. The opening 59 is of greater diameter than the opening 57 and has a releasable closure or stopper 61. One end of the line 55 is secured to the closure 61. At the other end of the line 55 a swivel snap-eye 63 similar to the eyes 27 and 29 is secured. By pulling on the closure 61 and the line 55, the line 55 may be pulled into the body 53 when the apparatus is not in use. By pulling on the eye 63 the line may be pulled out of the body 53 when the apparatus is to be used. Enough line is usually pulled out to correspond to the distance between the stakes 11 and 13. When the desired length of line is pulled out, the line may be knotted. At the end of the operation the line may be pulled back into the body by pulling on the stopper, and the line. The knot may be released when a longer line is desired.

In the use of the apparatus in training a canine C. the stakes 11 and 13 are fixed in the ground. The eye 63 is snapped on the canine's collar 65. The line 55 is extended through opening 57 a distance somewhat longer than the distance between the stakes 11 and 13. The line 55 is then snapped into one of the eyes 27 at the end near the body 53 and into the other eye 29 at the end near the canine C. The trainer then stands near the stake 11 and commands "stay." The canine tries to move but cannot because the body 53 engaging the snap 27 prevents movement. The trainer then releases the line from the snap 27 and commands "come." The canine then moves towards the trainer at stake 11 pulling the body 53 towards the stake 13 (Fig. 4). When the canine reaches the stake 11, the trainer engages the line with eye 27, goes to stake 13 and then commands "stay" (Fig. 5). The above-described process is then repeated. The canine is thus conditioned to remain at rest on the command "stay" and to move towards the trainer on the command "come."

While a preferred embodiment has been disclosed herein, many modifications thereof are feasible. This invention thus is not be be restricted except insofar as is necessitated by the spirit of the prior art.

I claim as my invention:

1. Training apparatus for a canine having a collar and including a first stake, a second stake, a body having a line extending therefrom, one end of said line being secured to said body and the other end of said line releasably engaging said collar, and means on each stake releasably engaging said line, each said last-named means permitting said line to pass but preventing said body from passing through.

2. Training apparatus for a canine having a collar and including a first stake, a second stake, a body having a line extending therefrom, one end of said line being secured to said body and the other end of said line having a snap releasably engaging said collar and a snap on each stake releasably engaging said line, each said last-named means permitting said line to pass but preventing said body from passing through.

3. Training apparatus for a canine having a collar and including a first stake, a second stake, a body having a line extending therefrom, said body including means for varying the length of said line, one end of said line being secured to said body and the other end of said line releasably engaging said collar, and means on each stake releasably engaging said line, each said last-named means permitting said line to pass but preventing said body from passing through.

References Cited in the file of this patent

UNITED STATES PATENTS

| | | |
|---|---|---|
| 409,137 | Candee | Aug. 13, 1889 |
| 1,390,982 | Christensen | Sept. 20, 1921 |
| 1,626,545 | March | Apr. 26, 1927 |
| 2,437,786 | Oberdorf et al. | Mar. 16, 1948 |
| 2,790,419 | Sullivan | Apr. 30, 1957 |